United States Patent [19]

Ziegler

[11] 4,362,952
[45] Dec. 7, 1982

[54] APPARATUS AND METHOD FOR INITIATION OF RECIPROCAL REMOTE FEEDING OF INTERMEDIATE STATIONS OF A COMMUNICATION INSTALLATION

[75] Inventor: Alfred Ziegler, Munich, Fed. Rep. of Germany

[73] Assignee: Siemens Aktiengesellschaft, Berlin & Munich, Fed. Rep. of Germany

[21] Appl. No.: 169,952

[22] Filed: Jul. 18, 1980

[30] Foreign Application Priority Data

Aug. 17, 1979 [DE] Fed. Rep. of Germany ....... 2933439

[51] Int. Cl.³ .............................................. H04B 3/44
[52] U.S. Cl. ........................................ 307/77; 307/64; 307/86; 179/170 J
[58] Field of Search ...................... 307/77, 78, 85, 86, 307/51, 64–68; 179/170 J, 175, 2 C

[56] References Cited

U.S. PATENT DOCUMENTS

| 2,657,279 | 10/1953 | Kelly ............................... | 179/170 J |
| 3,535,474 | 10/1970 | Duimelaar ........................ | 179/170 J |
| 3,639,773 | 2/1972 | Ayd et al. ........................... | 307/66 |
| 3,868,484 | 2/1975 | Bolton et al. ..................... | 179/170 J |

FOREIGN PATENT DOCUMENTS 1954579 5/1971 Fed. Rep. of Germany .
1286033 8/1972 United Kingdom .

Primary Examiner—G. Z. Rubinson
Assistant Examiner—James L. Dwyer
Attorney, Agent, or Firm—Hill, Van Santen, Steadman, Chiara & Simpson

[57] ABSTRACT

Method and apparatus for start-up of reciprocal remote supply feeding of intermediate stations utilizing DC current series feeding. In the operation of remote feeding systems of this type, the switch-on operation for reasons of safety for the individuals, must be accomplished only after testing the remote feeding circuit for freedom of faults. For this purpose the invention provides a test current circuit delivered by one feed circuit which triggers a transmission and delivery of a remote feed current in the other feed circuit which in turn causes in the first feed circuit a change-over switch to operate to switch from test current to remote feed current. The apparatus and method is particularly suitable for the remote feeding of intermediate amplifiers in transmission line sections of communication engineering systems.

8 Claims, 5 Drawing Figures 4,362,952

APPARATUS AND METHOD FOR INITIATION OF RECIPROCAL REMOTE FEEDING OF INTERMEDIATE STATIONS OF A COMMUNICATION INSTALLATION

BACKGROUND OF THE INVENTION

1. Field of the Invention

This invention relates in general to apparatus and method for the start-up of reciprocal remote supply feeding of intermediate stations of the communication installation, wherein in a remote supply feed circuit designed for DC current series feeding, a series connection of two feed circuits is provided, which are interconnected by way of a feed wire pair, with each of the feed circuits containing a constant current source.

2. Description of the Prior Art

German Pat. No. OS 2,260,335 which corresponds to U.S. Pat. No. 3,868,484 discloses a start-up circuit.

During the start-up of a remote feed supply circuit which operates with feed from both ends and contains no switching apparatus for closing the remote feed loop, the remote feeding device located at the other end is also designed to be capable of being automatically connected from the first feed location. For purposes of protecting individuals, the switching on and connection process must be executed only after testing the remote feed circuit to assure that it is free from faults.

It is known to carry out such testing with the aid of a voice frequency signal which subsequent to actuation of a start key is transmitted in one of the two feed stations by way of the remote feed current path to the other feed station. In the case of correct reception of the signal, the remote feed device is then automatically put in operation.

This voice frequency method requires voice frequency generators and receivers as well as switching installations which are required as additional apparatus to that required for the remote feeding apparatus.

SUMMARY OF THE INVENTION

It is an object of the invention, therefore, to provide method and apparatus that allows automatic start-up of the reciprocal remote supply feeding system with as few additional components as possible.

According to the invention, it provides that initially one of the feed circuits produces a test current which is lower than the feed current which is fed into the feed wire pair, and the other feed circuit delivers remote feed current to a bridging-over by-pass circuit and the bridging-over by-pass circuit is opened as soon as, in the case of the feed circuit feeding into the by-pass circuit, the test current or at least a specified fraction of the test current is determined to be present in the feed wire pair, and that the feed circuit transmitting the test current includes a switch-over which changes the test current to remote feed current as soon as in such feed circuit, at least a specified fraction of the remote feed current is determined to be present in the feed wire pair.

In the case of a start-up method and apparatus of this type, the protected starting up of the remote feed circuit occurs after testing the remote feed circuit with a constant DC voltage at an approximate level of, for example, 40 mA. An additional advantage of the invention consists in that monitoring circuits which are already present in the remote supply feed apparatus operate in the case of an impermissible voltage increase caused by line section interruption, causes a remote feed current to be reduced and the feed voltage to be restricted to a non-dangerous value, and such apparatus and method can be simultaneously utilized for the purpose of starting up the reciprocal two-ended remote feeding so that the start-up of the line section can be essentially carried out by the remote feeding apparatuses and almost no additional apparatus is required.

Remote feeding apparatus which operates with a drop of the feed voltage at the line section which occurs in the case of an impermissible voltage increase caused by line section interruption, are described in German LP No. 1,902,090 which corresponds to British Pat. No. 1,286,033.

In a preferred embodiment of the invention, initially both feed circuits transmit remote feed current to bridging-over branches which subsequently in one of the feed circuits, allows the current source to be switched from remote feed current to test current, and the bridge circuit branch is opened.

In an additional development of the invention, the test current can be mainly adjusted, and the additional operation of start-up are automatically controlled. A start key such as one which is normally closed during normal operation can serve for manual adjustment of the test current.

An additional embodiment of the invention provides that a circuit is designed such that at least one of the feed circuits includes a diode which transmits the DC current arriving from the other feed station and a first switch is mounted in the bridging-over branch which is controlled by the current flowing in the remote current circuit. The minimum operating or threshold value of the first switch can be expediently varied from one of the feed stations, depending upon the current transmitted by the current source.

Additionally, at least one of the feed circuits includes apparatus for limiting the output voltage when the test current is received.

Other objects, features and advantages of the invention will be readily apparent from the following description of certain preferred embodiments thereof, taken in conjunction with the accompanying drawings, although variations and modifications may be effected without departing from the spirit and scope of the novel concepts of the disclosure, and in which:

DESCRIPTION OF THE PREFERRED EMBODIMENTS

Figure 1:
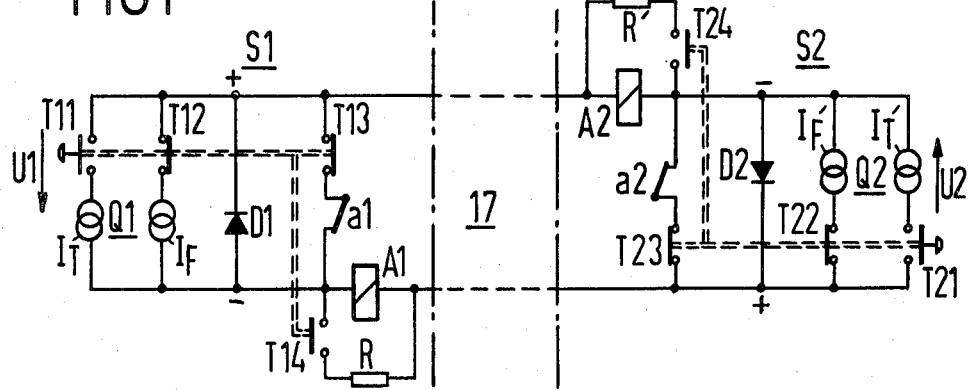
FIG. 1 illustrates the circuit and apparatus of the invention in its initial condition.
Figure 2:
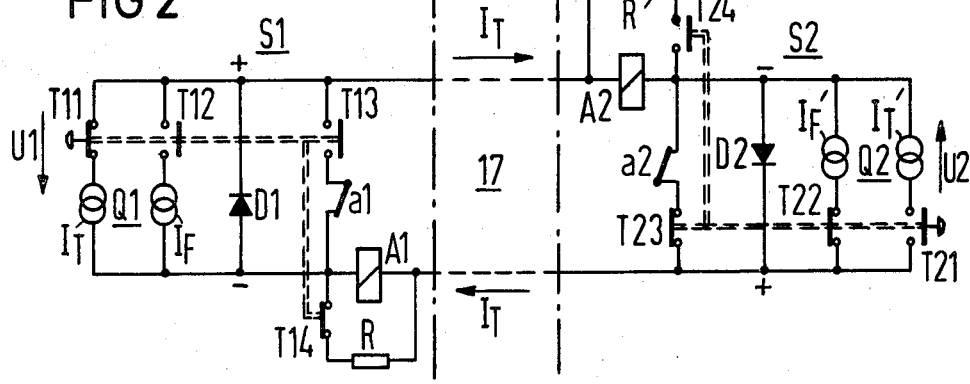
FIG. 2 illustrates the circuit when the start switch at feed circuit S1 has been closed.
Figure 3:
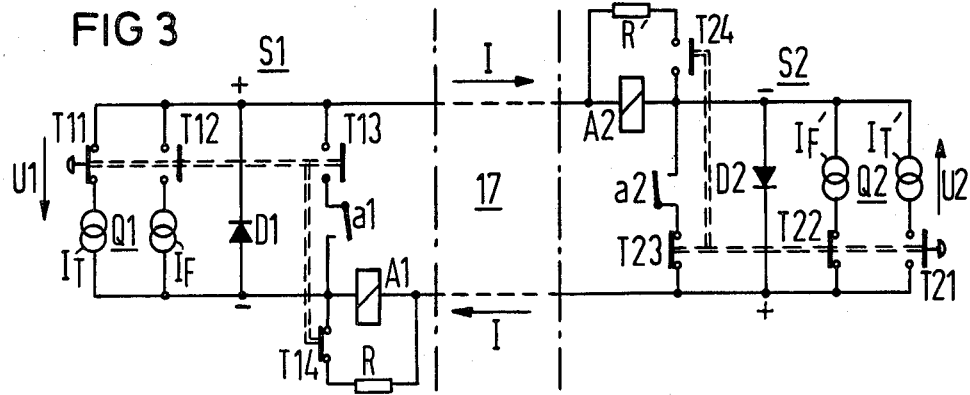
FIG. 3 illustrates the circuit at a subsequent time after FIG. 2.
Figure 4:
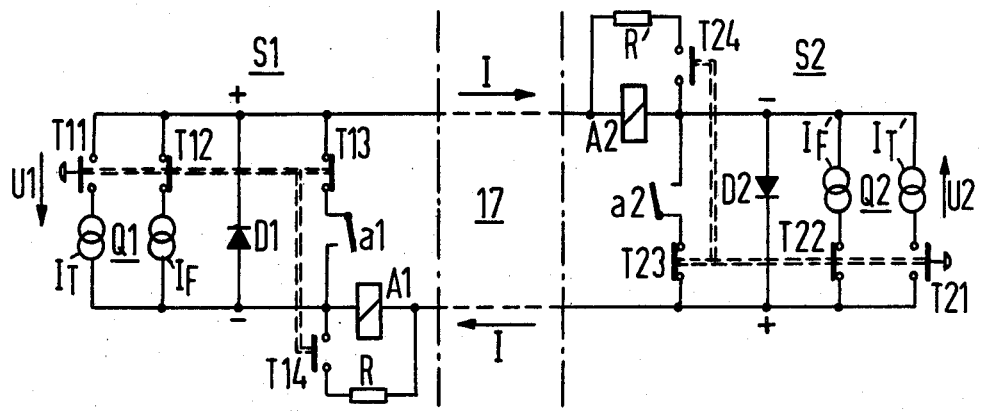
FIG. 4 illustrates the circuit at a time subsequent to FIG. 3.

FIGS. 1 through 4 illustrate the circuit of the invention at different times in the initiation of start-up of the circuit, and the same components are shown in FIGS. 1 and 4. A remote feed circuit 17 is to be fed from either of the feed circuits S1 and S2, and is connected to each of the feed circuits as shown. The first feed circuit comprises a current source Q1 which has a first test current branch $I_T$ and a second feed current branch $I_F$. A manually closable switch has contacts T11, T12, T13 and T14, with a switch contact T11 being normally open and connected in the circuit with the test current source $I_T$ of the current source Q1 and the contacts T12 being initially closed and connected in circuit with the feed current source IF of the current source Q1. A diode D1 is connected in parallel with the current source Q1 and the switch contacts T11 and T12, as shown. The crossover or branching circuit comprises switch contact T13 and relay contact a1 in series therewith, and a relay A1 is connected in the feed line to the circuit 17 as shown. An impedance, such as the resistor R can be connected in parallel with the relay A1 by closing of the switch contacts T14. The switch contacts T11, T12, T13 and T14 are mechanically connected together and can be controlled manually with a manual switch button.

The remote feed circuit S2 comprises a relay A2 which is in the feed line to the circuit 17 and a resistance R' can be placed in parallel with the relay A2 when switch contacts T24 are closed. The second feed circuit S2 includes a current source Q2 which has a test current source $I'_T$ and a feed current source $I'_F$ which are connected in parallel and to switch contacts T21 and T22. A diode D2 is connected in parallel with the current source Q2, as shown. The cross-over or branching circuit comprises relay contact switch a2 and contacts T23, as shown. The switch contacts T21, T22, T23 and T24 can be controlled by a manual switch.

The switch contacts T11 and T12 allow the test current $I_T$ or the remote feed current $I_F$ to be selectively selected at the current source Q1. The current supplied by the current source Q1 flows either through the branching-over branch consisting of the contact T13 and the relay closed switch a1 or alternatively if the relay A1 is energized so that switch a1 is opened, the feed circuit Q1 will supply current to the circuit 17.

The diode D1 which is connected in parallel with the bridging-over branch T13 and a1 transmits current arriving from the other feed circuit S2. The minimum operating or threshold value of the relay A1 can be reduced to approximately one-half the remote feed current by contact T14 which connects shunt resistor R in parallel with the relay A1 when switch T14 is closed.

The feed circuit S2 is constructed similar to the feed circuit S1 as shown, and the polarity indications in the feed circuits S1 and S2 are as indicated in the Figures.

The position of the various switches illustrated in FIGS. 1 through 4 occur after the initiation of the depression of the manual switch in feed circuit S1, after which a reciprocal feeding of the remote feed circuit with feed current $I_F$ is triggered. Expediently, the voltage at the outputs of the feed circuits S1 and S2 is limited to a value which matches the line section length between them.

Initially, before the switches at either feed circuits S1 and S2 are closed, the switches are in the position shown in FIG. 1, and the feed current $I_F$ respectively flows from the current source $I_F$ through closed switch contact T12 through the bridging branch switch contact T13 relay contact a1. At feed circuit S2, the feed current $I'_F$ flows to the bridging circuit comprising the two contacts T23 and T22. At this time, the current sources Q1 and Q2 are short-circuited, and the relays A1 and A2 are unenergized.

The switch at feed circuit S1 is closed which closes switch T11, opens switch T12, opens switch T13, and closes switch T14. The current source Q1 is switched from feed current $I_F$ to supply test current $I_T$. Since the contact T13 is opened, the bridging circuit is opened, and test current $I_T$ is fed into the remote feed circuit, as shown in FIG. 2.

As illustrated in FIG. 3, the current $I_T$ passes through the relay A2 in the feed circuit S2, and the relay A2 is energized which opens contact a2 which disconnects the bridging-over circuit. The remote feed current transmitted by the current source Q2 of the feed circuit S2 will then be fed into the remote feed circuit 17 and will energize the relay A1 which will open switch a1 in the feed circuit S1.

Then the switch contacts at the feed circuits S1 and S2 will be in the condition illustrated in FIG. 4, and it will be assumed that the manual start-up switch is released the bridging-over branch will remain open, since the relay A1 has opened the switch contact a1 as illustrated in FIG. 4. When the start-up switch is released, then the switch T11 will open, and the switch T12 will close, as will the switch T13 and switch T14 will open, so feed circuit S1 will then supply the remote feed circuit, and will supply feed current $I_F$ from the current source Q1 as illustrated in FIG. 4. In a similar fashion, reciprocal feeding will occur from feed circuit S2, and both the current supplies Q1 and Q2 will be supplying feed circuit $I_F$ to the circuit 17.

Figure 5:
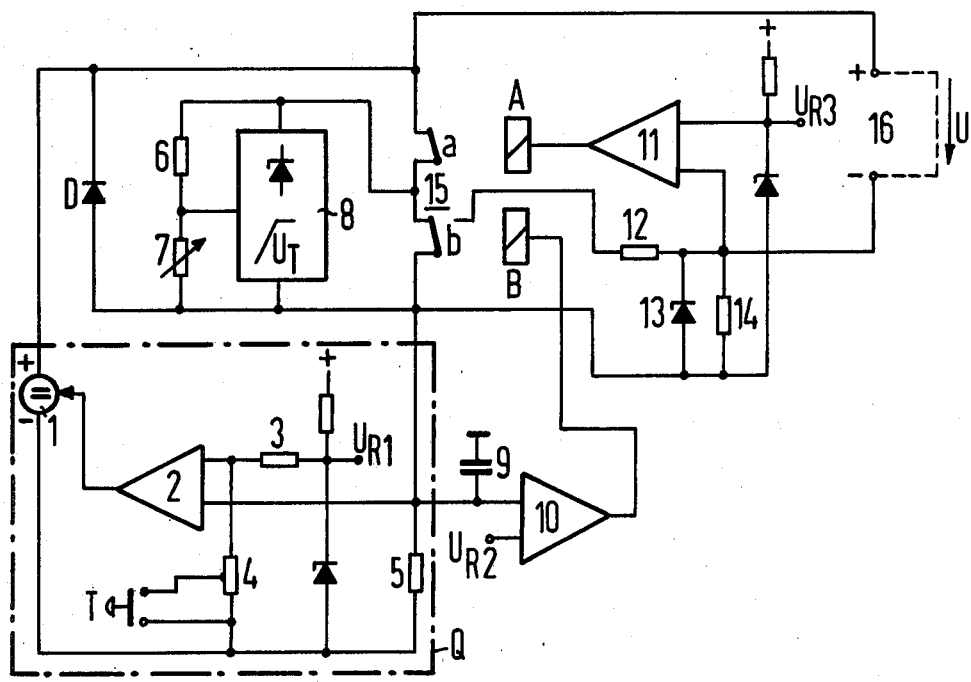
FIG. 5 is a schematic diagram for a feed circuit according to the invention.

FIG. 5 comprises an electrical schematic of a feed circuit in which by means of a switch T, only the current source 1 is directly operated and controlled and the additional operating sequences are automatically initiated by threshold control switches.

In FIG. 5 the current source 1 can be turned off by way of the measuring resistance 5, and the bridging circuit branch connected in series with the two relay contacts a and b. Switch a is a break contact, and switch b is a change-over contact, which in the rest condition connects the measuring resistance 5 with the relay contact a, and when relay B is energized, separates the connection of the measuring resistance 5 with the relay contact a. Connected in parallel with the bridging-over branch 15 is a diode D which has a polarity such that it is blocked for current arriving from the local current source 1 and it transmits current arriving from the other feed location.

Connected in parallel with the relay contact switch b is a voltage limiter 8 and when the relay B is energized so that switch b is open and when relay A is unenergized so that relay switch a is closed, the voltage limiter is effective, and limits the voltage occurring at the bridging-over branch 15 to a value which is adjustable with the variable voltage divider comprising the resistors 5, 6 and 7 which are also connected in parallel with the relay contact b. If this value is adjusted to be only slightly above the voltage drop necessary for the line section check, the start-up of the line section can be prevented in the case of a foreign series connected resistance.

The positive pole of the output terminal pair 16 is directly connected to the positive pole of the current source 1. The negative terminal of the output terminal pair 16 is connected at the connection point of the bridging-over branch 15 with the measuring resistance 5 by way of the measuring resistance 14 which is connected in parallel for the purposes of limiting the voltage drop through the Zener diode 13. The other side of the resistor 5 is connected to the negative pole of the current source 1.

The current source 1 is controlled with a differential amplifier 2. The differential amplifier 2 has one of its inputs connected to the tap of the voltage divider between resistors 3 and 4, and the other side of resistor 3 is connected to a reference voltage source UR1. A key switch T allows a portion of the resistance 4 to be short-circuited so that the comparison voltage which serves as the command variable to the current source 1 can have two different values.

The measuring resistance 5 is connected between the other input of the differential amplifier 2 and the negative pole of the current source 1. When the switch key T is open, the current source 1 delivers a constant current having a magnitude of the remote feed current $I_F$ which is provided for normal operation. When the key switch T is closed, a constant check current or test current will be supplied by the current source 1. The test current is indicated as $I_T$.

The voltage drop across the measuring resistor 14 controls the differential amplifier 11 which serves as the threshold value switch. One side of the resistor 14 is connected to the negative pole of the feed terminal pair 16 and the other side of resistor 14 is connected to a diode to the reference voltage $U_{R3}$. The relay A is connected to the output of the differential amplifier 11, which is connected as shown.

The change-over contact switch b at rest is a break contact in the bridging-over branch 15, as a working or energized contact, when the relay B is energized connects the shunt resistor 12 in parallel with the measuring resistance 14.

If circuit arrangements according to FIG. 5 are connected at both sides of a remote feeding circuit, then the following operational sequence results for starting up the two-sided feeding arrangement.

Initially in both feeding stations, the key switches T are in the open position. The control unit 2 ensures in each instance that the current source 1 delivers a current which corresponds to the remote feed current $I_F$ during normal operation.

As soon as the key switch T is depressed in either of the two feed circuits, there is supplied to the control unit 2 a control voltage of such a type that the current source 1 delivers a decreased constant current, namely, the test current $I_T$ to the bridging-over branch 15. After a delay time determined by the capacitance of a capacitor 9 the B relay will be energized, and contact switch b will open. The delay through the capacitor 9 is provided so that during start-up of the apparatus during the upward regulation of the feed current to the rated value, energization of the relay B will not prematurely occur.

When the relay B opens switch b, the bridging-over circuit 15 will be opened such that the voltage limiter 8 is in series with the control element 2, and thus a test current will be fed into the remote feeding circuit and simultaneously the voltage will be limited to a specified predetermined non-dangerous value.

At the same time when relay B is energized, the resistance 12 will be connected in parallel with resistor 14, and in this switching state, the relay A will be energized by way of the threshold value switch 11 only when the current flowing into the remote feed circuit is at least approximately equal to one-half the remote feed current.

At the other feed station, the key T is not depressed. The minimum operating value or threshold of the threshold value switch 11 is therefore, solely determined by the measuring resistance 14. The relay A is only energized when the current flowing in the remote feeding circuit is equal to the test current $I_T$. A delay of the threshold value switch 11 assures that the relay A will not be actuated during the change-over switching of contact b.

In the case of an error-free line section, the test current is measured at the remote feed station, and the A relay will be energized after a minimum delay time lag provided for safety reasons. Then the contact a will open, and the remote feed current $I_F$ will no longer flow by way of the bridging-over branch 15, but will flow into the remote feeding circuit. If the feeding station in which the key T was depressed determines that the current flowing in the remote feeding station is at least equal to one-half the remote feed current $I_F$, the A relay will be energized, and the a contact will be opened. If the key T is then released, then the current source 1 supplies remote feed current $I_F$ to the remote feed circuit, since after drop-out or release of the relay B, the bridging-over branch 15 is interrupted due to the open contact a.

Independently of the switch-on or start-up functions, the monitoring functions, which are known per se can be retained, thus, for example, the disconnection in the case of excess current, or the reduction of the output voltage to 0 volts in the case of a drop of the remote feed current by a specified amount can be accomplished. In the latter instance, merely the reduction of the delay time of the feed circuit S2 must be longer than the connection or hook-up time of the feed circuit S1.

The feed circuit illustrated in FIG. 5 has the following characteristics. In the case of low current where I is less than $I_{Fsp}$, the output voltage will be reduced to 0 volts. The voltage limitation in the case of a test current supply can be adjusted to a limiting value which is dependent upon the line section length. A longitudinal or series impedance connected in the remote feeding circuit can here also be recognized, which is effective only in the case of key depression. Due to these characteristics, the following results for the monitoring of the remote feed during the operation can occur. If either through failure or breakdown of a feeding station, or through faults which are indicated by increase of the line section resistance, the remote feed current drops by a specified amount, both feed circuits reduce their output voltages to 0 volts. An experimental start-up which is only possible by hand, would be able to supply only the safe test current of, for example, 40 mA into the interrupted line section. The operation with full remote feed current is possible only after the testing of the remote feed circuit has occurred and the circuit has been indicated as safe.

Although the invention has been described with respect to the preferred embodiments, it is not to be so limited as changes and modifications may be made which are within the full intended scope as defined by the appended claims.

I claim as my invention:

1. The method for starting-up two-sided remote feeding of intermediate stations of a communications installation, whereby, in a remote feeding circuit, designed for d.c. current-series feeding, a series connection of two feeding circuits interconnected via a feed wire pair is provided, each of which feeding circuits contains a constant current source, characterized in that, first, by means of one of the feeding circuits, a test current which is lower than the remote feed current, is fed into the feed wire pair, whereas the other feed circuit transmits remote feed current to a bridging-over branch, and the bridging-over branch is opened as soon as, in the feed circuit, feeding into the bridging-over branch, the test current or at least a specified fractional amount of the test current is ascertained in the feed wire pair, and in the feed circuit transmitting the test current, a change-over switch is actuated from the test current to remote feed current as soon as the feed circuit has at least a specified fractional portion of the feed current in the feed wire pair.

2. The method according to claim 1, characterized in that at first both feed circuits transmit remote feed current to a bridging-over branch, and that subsequently, in the one feed circuit the current source is switched over from the remote feed current to the test current, and that the bridging-over branch is opened.

3. A start-up circuit for a two ended two conductor transmission line comprising at each end of the transmission line a current source with parallel connected test current branch and feed current branch first and second switches connected respectively in said parallel branches, third and fourth switches connected in series across said parallel connected test current branch and feed current branch, a first relay connected in series with said transmission line and said test current branch and said feed current branch, and connected to control said fourth switch, a fifth switch and a resistor connected in series and the combination connected in parallel with said relay and a switch actuator connected to said first, second, third and fifth switches.

4. A start-up circuit according to claim 3 including a diode connected in parallel with said test current branch and said feed current branch.

5. A start-up circuit according to claim 3 including a second relay and wherein the first and second relays at each end of the line are in series with different conductors of said transmission line.

6. A start-up circuit for a two ended two conductor transmission lines comprising a feed circuit at each end of said line and a bridging branch in each feed circuit, at least one of the feed circuits (S1, S2) contains a diode (D, D1, D2) which is connected in parallel to the bridging branch and said diode passes direct current flowing from the other feed circuit location, a first switch (a, a1, a2) mounted in the bridging branch (T13, a1, T23, a2, 15) and is controllable by current flowing in the remote feed circuit, a second controllable switch (b) mounted in the bridging branch (15) and in series with the first switch (a) and controllable by current flowing in the remote feed circuit (17), said second controllable switch (b) controllable by current supplied by a local current source (Q1, Q2, 1) which supplies current such that for the currents which are smaller than or equal to a test current the bridging branch (15) is interrupted and the response value of the first switch (a, a1, a2) is respectively variable as a function of the current supplied by the current source (1) in a manner such that it corresponds to a known value fraction of the remote feed current ($I_F$) for the emitted test current ($I_T$) and corresponds to a known fraction of the test current ($I_T$) for a supplied remote feed current ($I_F$).

7. A start-up circuit according to claim 6 including a device (8) for limiting the output voltage during feed of the test current ($I_T$) mounted in at least one of the feed circuits (S1, S2) and connected in parallel to the second controllable switch (b), and the second controllable switch (b) provided with a device for response lag.

8. A start-up circuit according to claim 7 including a responsive second controllable switch (b) and the response value of the first controllable switch (a) is increased in a manner such that it only responds for known current values which are at least equal to one half of the remote feed current ($I_F$).

* * * * *